United States Patent
Kim et al.

(10) Patent No.: US 12,401,462 B2
(45) Date of Patent: Aug. 26, 2025

(54) METHOD FOR USER EQUIPMENT TO TRANSMIT AND RECEIVE FEEDBACK INFORMATION IN WIRELESS COMMUNICATION SYSTEM SUPPORTING SIDELINK AND DEVICE FOR SAME

(71) Applicant: LG ELECTRONICS INC., Seoul (KR)

(72) Inventors: Heejin Kim, Seoul (KR); Seungmin Lee, Seoul (KR)

(73) Assignee: LG Electronics Inc., Seoul (KR)

(*) Notice: Subject to any disclaimer, the term of this patent is extended or adjusted under 35 U.S.C. 154(b) by 30 days.

(21) Appl. No.: 17/768,075

(22) PCT Filed: Nov. 6, 2020

(86) PCT No.: PCT/KR2020/015540
§ 371 (c)(1),
(2) Date: Apr. 11, 2022

(87) PCT Pub. No.: WO2021/091320
PCT Pub. Date: May 14, 2021

(65) Prior Publication Data
US 2024/0056233 A1 Feb. 15, 2024

(30) Foreign Application Priority Data
Nov. 6, 2019 (KR) .................. 10-2019-0141209

(51) Int. Cl.
*H04L 1/1829* (2023.01)
*H04W 72/0453* (2023.01)

(52) U.S. Cl.
CPC .......... *H04L 1/1864* (2013.01); *H04L 1/1854* (2013.01); *H04W 72/0453* (2013.01)

(58) Field of Classification Search
CPC ....... H04L 1/1864; H04L 1/1854; H04L 5/00; H04W 72/0453; H04W 72/23; H04W 4/40; H04W 24/10; H04B 7/06
See application file for complete search history.

(56) References Cited

U.S. PATENT DOCUMENTS

| 2015/0156693 A1 | 6/2015 | Tabet et al. | |
| 2018/0220425 A1* | 8/2018 | Zhang | H04W 72/00 |
| 2020/0359391 A1* | 11/2020 | Baldemair | H04W 72/20 |

FOREIGN PATENT DOCUMENTS

WO  WO 2018169342  9/2018

OTHER PUBLICATIONS

Catt, "Sidelink physical layer procedures in NR V2X," 3GPP TSG RAN WG1 Meeting #98bis, R1-1910332, Chongqing, China, Oct. 14-20, 2019, 9 pages.

(Continued)

*Primary Examiner* — Dady Chery
(74) *Attorney, Agent, or Firm* — Fish & Richardson P.C.

(57) ABSTRACT

Disclosed are a method and device for a first user equipment (UE) to transmit feedback information in a wireless communication system that supports sidelink according to various embodiments. Disclosed are a method and a device for same, the method comprising the steps of: receiving, in a second carrier, a first signal including resource allocation information for a signal to be transmitted in a first carrier; receiving, in the first carrier, a second signal including at least one of a reference signal or data on the basis of the resource allocation information; and transmitting, in the second carrier, a third signal including feedback information related to the second signal, wherein the priority of a message related to the feedback information is set on the basis of the priority of a service related to the data.

7 Claims, 15 Drawing Sheets

(56) References Cited

OTHER PUBLICATIONS

Intel Corporation, "Design of physical layer procedures for NR V2X sidelink communication," 3GPP TSG RAN WG1 RAN1#96bis, R1-1904299, Xi'an, China, Apr. 8-12, 2019, 11 pages.
International Search Report and Written Opinion in International Application No. PCT/KR2020/015540, dated Feb. 23, 2021, 8 pages (with English translation).
Vivo, "Physical layer procedure for NR sidelink," 3GPP TSG RAN WG1 Meeting #98bis, R1- 1910217, Chongqing, China, Oct. 14-20, 2019, 24 pages.

* cited by examiner

PU5-U (a)

PU5-U (b)

(a)

(b)

METHOD FOR USER EQUIPMENT TO TRANSMIT AND RECEIVE FEEDBACK INFORMATION IN WIRELESS COMMUNICATION SYSTEM SUPPORTING SIDELINK AND DEVICE FOR SAME

CROSS-REFERENCE TO RELATED APPLICATIONS

This application is a National Stage application under 35 U.S.C. § 371 of International Application No. PCT/KR2020/015540, filed on Nov. 6, 2020, which claims the benefit of Korean Patent Application No. 10-2019-0141209, filed on Nov. 6, 2019. The disclosures of the prior applications are incorporated by reference herein in their entirety.

TECHNICAL FIELD

The present disclosure relates to a method of transmitting and receiving feedback information on a high frequency band by a user equipment on a low frequency band in a wireless communication system supportive of a sidelink and apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DETAILED DESCRIPTION OF DISCLOSURE

Technical Task

One technical task of the present disclosure is to provide a method and apparatus capable of securing high reliability of transmission/reception of a signal or message on a high frequency band by securing robustness for management of a beam formed on the high frequency band in a manner that feedback information on a signal received on the high frequency band is transmitted on a low frequency band having a relatively wide coverage.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

Technical Solutions

In one technical aspect of the present disclosure, provided is a method of managing a beam by a first user equipment in a wireless communication system supportive of a sidelink, the method including receiving a first signal including resource allocation information on a signal, which is to be transmitted on a first carrier, on a second carrier, receiving a second signal including at least one of a reference signal or data on the first carrier based on the resource allocation information, and transmitting a third signal including feedback information related to the second signal on the second carrier, wherein a priority of a message related to the feedback information may be configured based on a priority of a service related to the data.

The feedback information may include a measurement report on the reference signal or Hybrid Automatic Repeat Request (HARQ) feedback on the data.

The first user equipment may change a carrier on which the third signal will be transmitted into the first carrier from the second carrier based on at least one of a presence or non-presence of generation of data to be transmitted on the first carrier, requirements of the service related to the data, or a Channel Busy Ratio (CBR) of the second carrier.

If the CBR for the second carrier is equal or greater than a preset threshold, the transmission of the third signal over the second carrier fails to meet a delay condition for the service, or the transmission data is generated, the third signal may be transmitted on the first carrier.

Based on at least one of a presence or non-presence of generation of data to be transmitted on the first carrier, requirements of the service related to the data, or a Channel Busy Ratio (CBR) of the second carrier, the first UE may transmit the third signal on the first carrier as well.

If the CBR for the second carrier is equal or greater than a preset threshold, the transmission of the third signal over the second carrier fails to meet a delay condition for the service, or the transmission data is generated, the third signal may be transmitted on each of the first carrier and the second carrier.

The measurement report may include at least one of a measurement report on RSRP (Reference Signal Received Power), RSRQ (Reference Signal Received Quality), SNR (Signal Noise Ratio) or SINR (Signal to Interference plus Noise Ratio) in the first carrier, a beam failure announcement, or a beam failure recovery request.

The first carrier may have a frequency band higher than the second carrier.

The first carrier may include a carrier in a mmWave frequency band.

The reference signal may include a reference signal for beam management, a CSI-RS (channel state information reference signal), or a TRS (Tracking Reference Signal).

In another technical aspect of the present disclosure, provided is a method of transmitting feedback information by a first user equipment in a wireless communication system supportive of a sidelink, the method including receiving a first signal including resource allocation information on a signal, which is to be transmitted on a first carrier, on a second carrier, receiving a second signal including at least one of a reference signal or data on the first carrier based on the resource allocation information, and transmitting a third signal including feedback information related to the second signal on a carrier determined from the first carrier and the second carrier based on at least one of a presence or non-presence of generation of data to be transmitted on the first carrier, requirements of a service related to the data, or a Channel Busy Ratio (CBR) of the second carrier, wherein based on transmitting the third signal on the second carrier, a priority of a message related to the feedback information may be configured based on a priority of the service related to the data.

In another technical aspect of the present disclosure, provided is a method of receiving feedback information by a second user equipment in a wireless communication system supportive of a sidelink, the method including transmitting a first signal including resource allocation information on a signal, which is to be transmitted on a first carrier, on a second carrier, transmitting a second signal including at least one of a reference signal or data on the first carrier based on the resource allocation information, and receiving a third signal including feedback information related to the second signal on the second carrier, wherein a priority of a message related to the feedback information may be configured based on a priority of a service related to the data.

In another technical aspect of the present disclosure, provided is a first user equipment transmitting feedback information in a wireless communication system supportive of a sidelink, the first user equipment including a Radio Frequency (RF) transceiver and a processor connected to the RF transceiver, the processor controlling the RF transceiver to receive a first signal including resource allocation information on a signal, which is to be transmitted on a first carrier, on a second carrier, receive a second signal including at least one of a reference signal or data on the first carrier based on the resource allocation information, and transmit a third signal including feedback information related to the second signal on the second carrier, wherein a priority of a message related to the feedback information may be configured based on a priority of a service related to the data.

In another technical aspect of the present disclosure, provided is a chipset performing transmission of feedback information in a wireless communication system supportive of a sidelink, the chipset including at least one processor and at least one memory operably connected to the at least one processor and enabling the at least one processor to perform an operation when executed, the operation including receiving a first signal including resource allocation information on a signal, which is to be transmitted on a first carrier, on a second carrier, receiving a second signal including at least one of a reference signal or data on the first carrier based on the resource allocation information, and transmitting a third signal including feedback information related to the second signal on the second carrier, wherein a priority of a message related to the feedback information may be configured based on a priority of a service related to the data The processor may control a driving mode of a device connected to the chipset based on a priority of the third signal.

In another technical aspect of the present disclosure, provided is a computer-readable storage medium including at least one computer program enabling at least one processor to perform a transmission operation of feedback information in a wireless communication system supportive of a sidelink, the computer-readable storage medium including at least one computer program enabling the at least one processor to perform the transmission operation of the feedback information and a computer-readable storage medium storing the at least one computer program, wherein the operation may include receiving a first signal including resource allocation information on a signal, which is to be transmitted on a first carrier, on a second carrier, receiving a second signal including at least one of a reference signal and data on the first carrier based on the resource allocation information, and transmitting a third signal including feedback information related to the second signal on the second carrier and wherein a priority of a message related to the feedback information may be configured based on a priority of a service related to the data.

Advantageous Effects

Various embodiments may ensure high reliability of transmission and reception of signals or messages in a high frequency band by securing robustness for management of a beam formed in the high frequency band in a manner of transmitting feedback information on a signal, which is received on the high frequency band, on a low frequency band with relatively wide coverage.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE FOR DISCLOSURE

Figure 1:
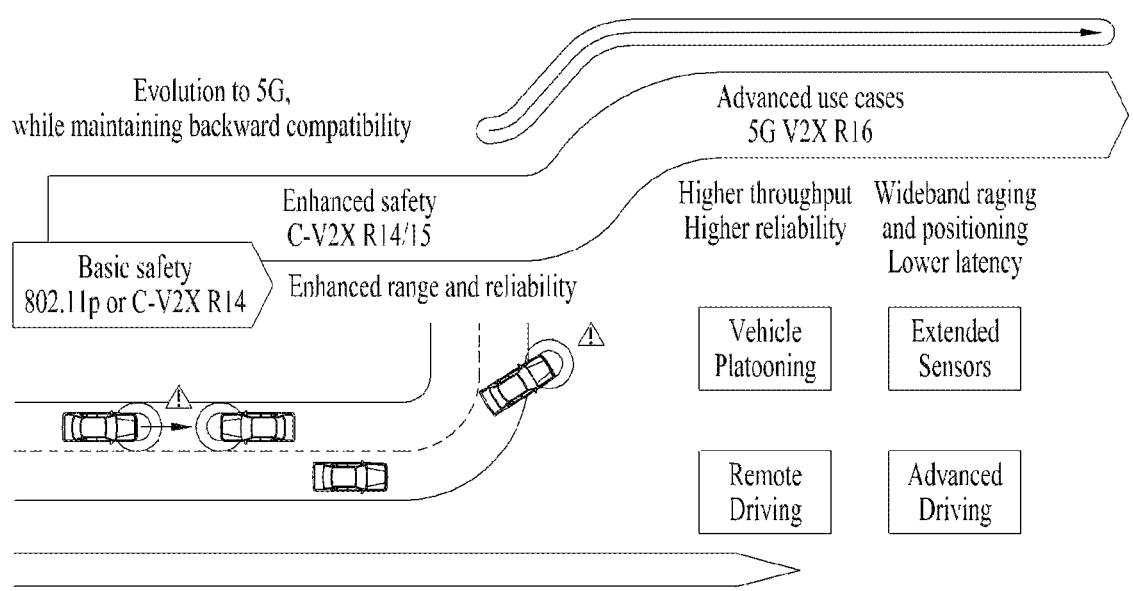
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
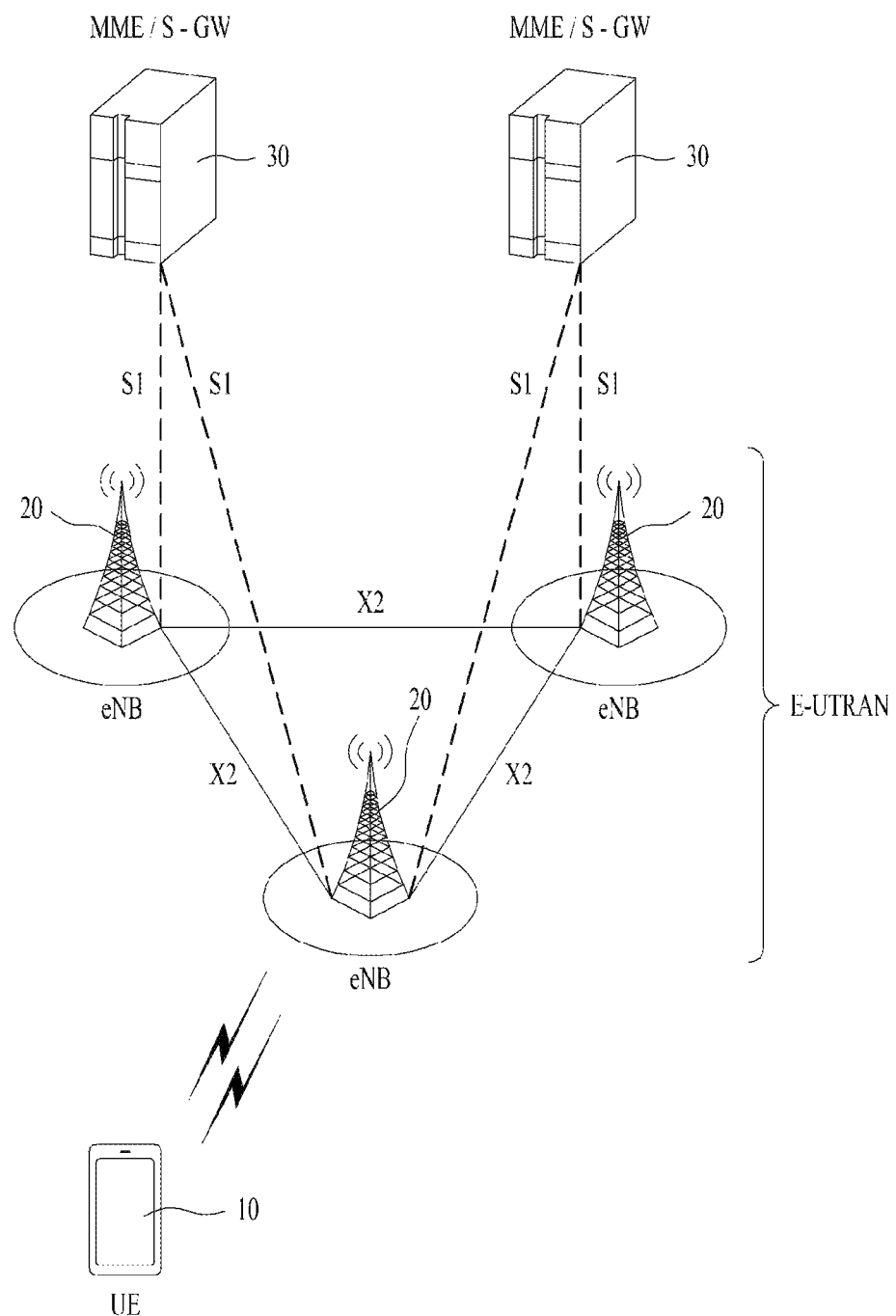
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
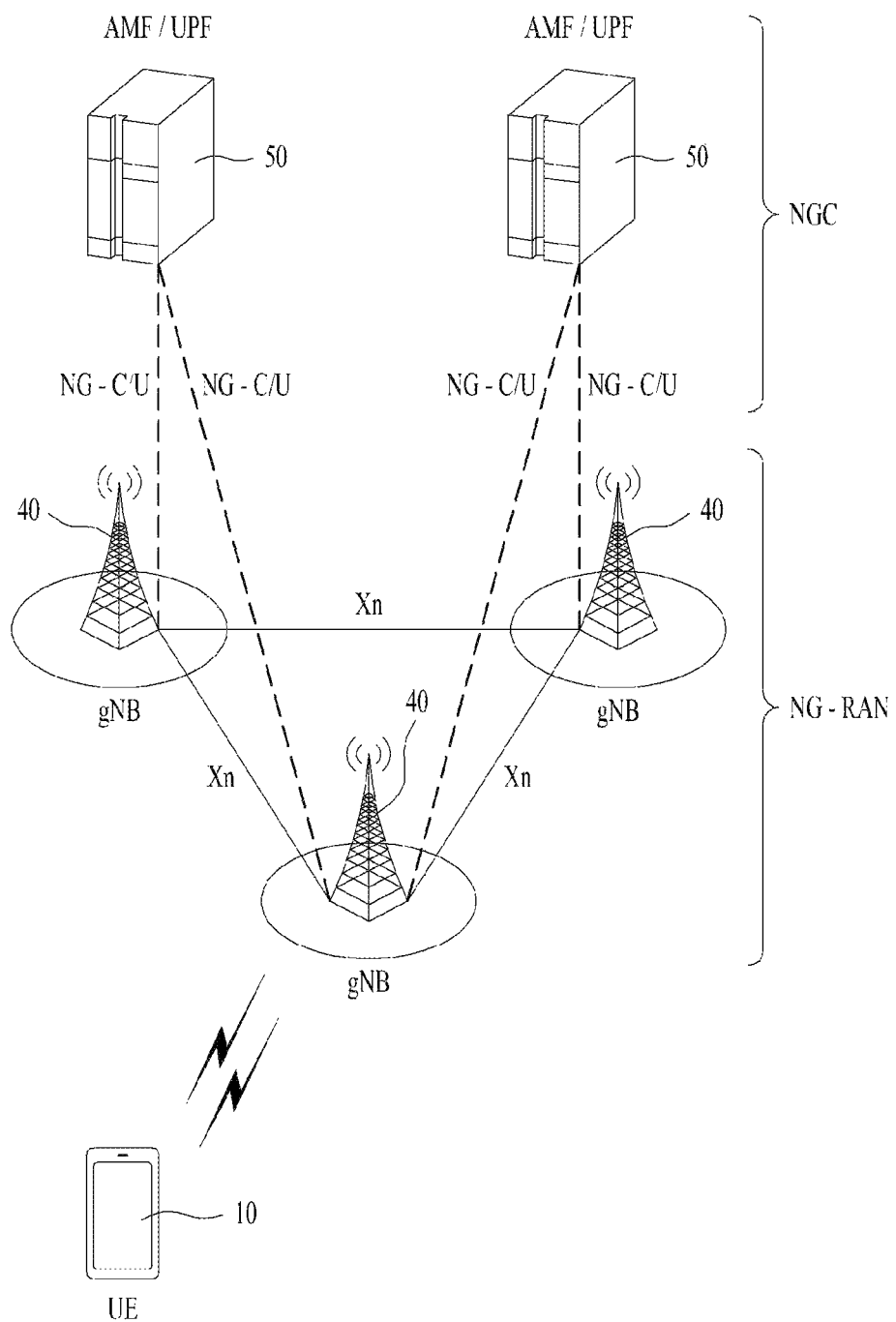
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
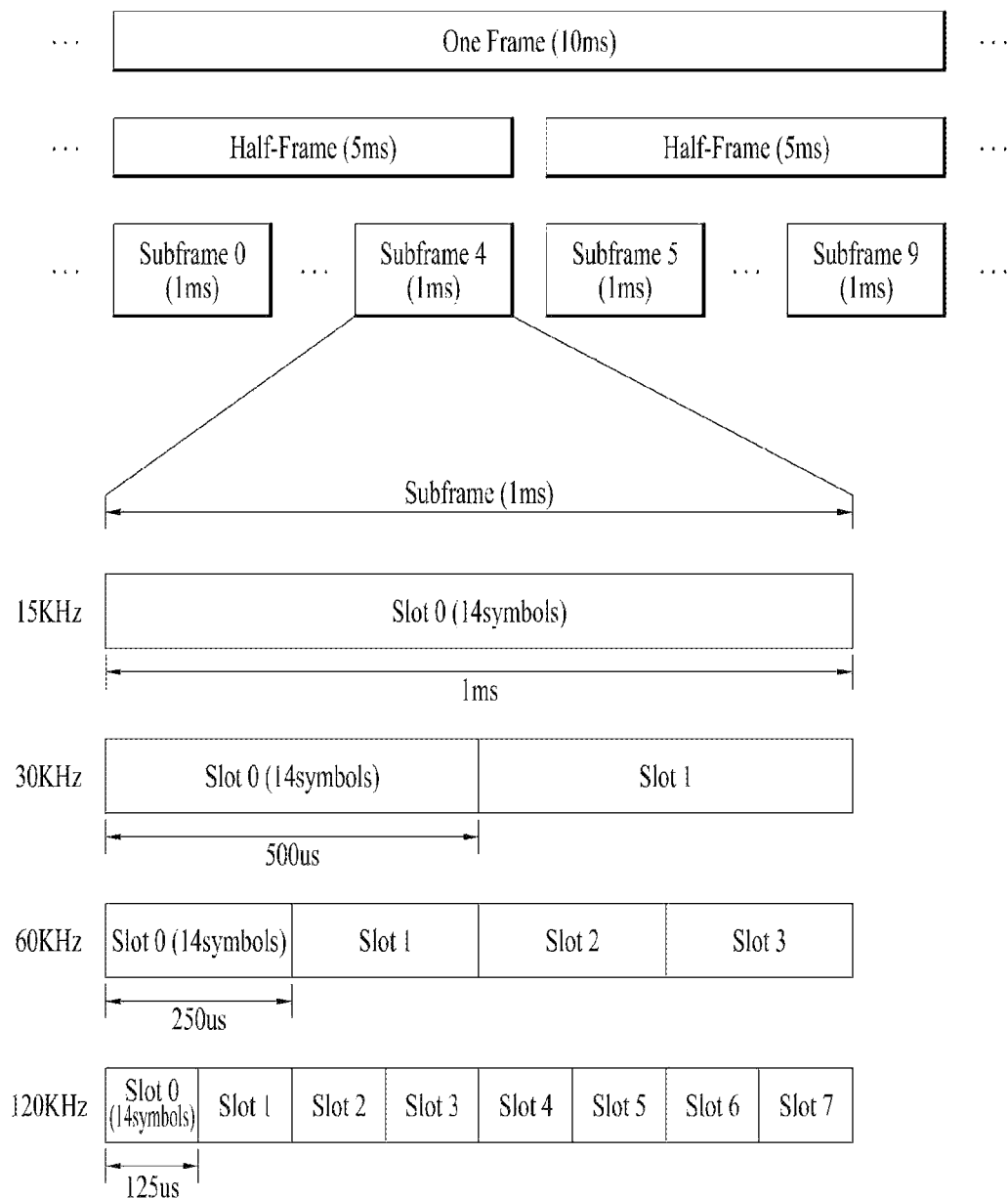
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15*2 u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |

TABLE 3-continued

| Frequency Range designation | Corresponding frequency range | Subcarrier Spacing (SCS) |
|---|---|---|
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
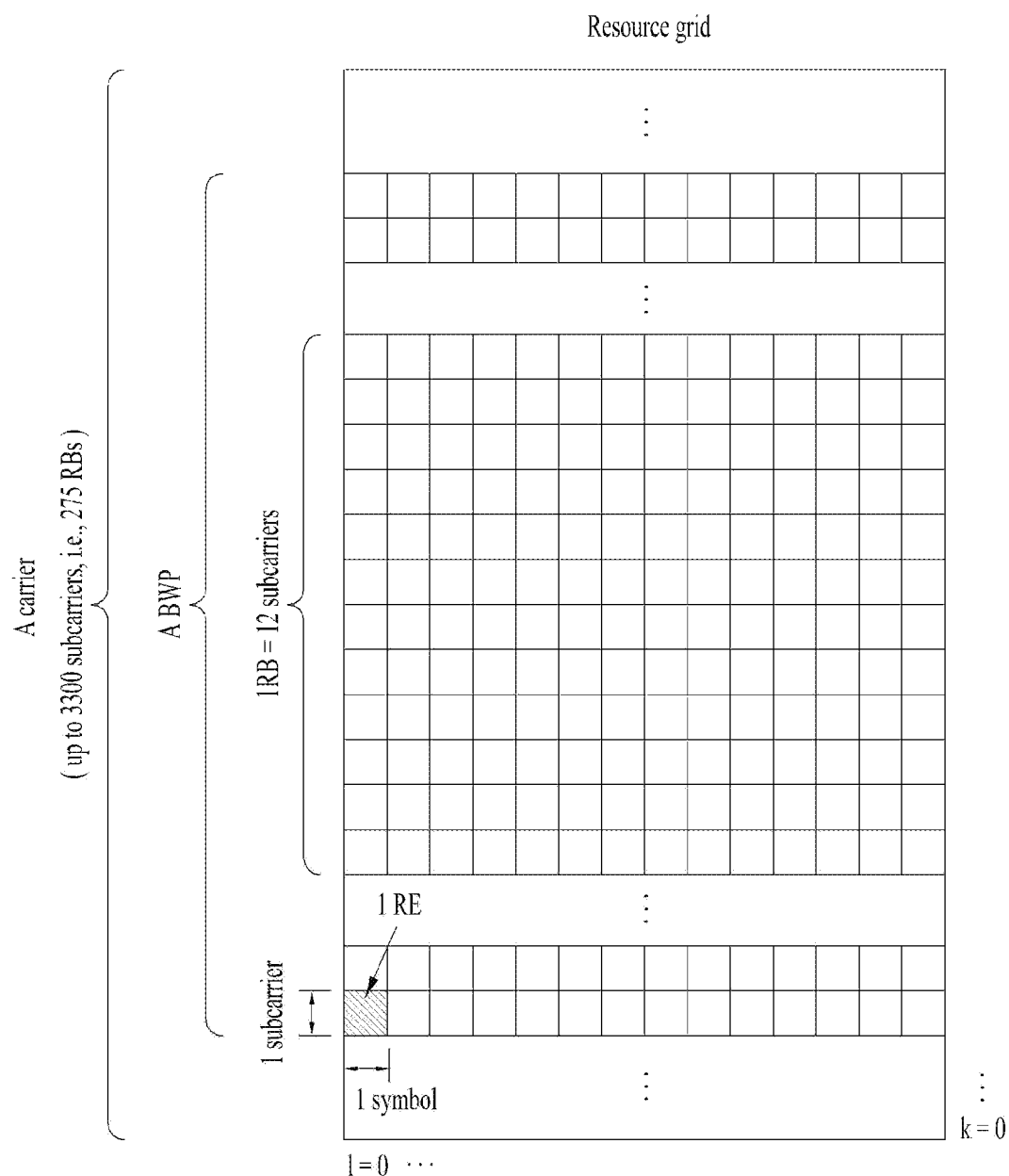
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
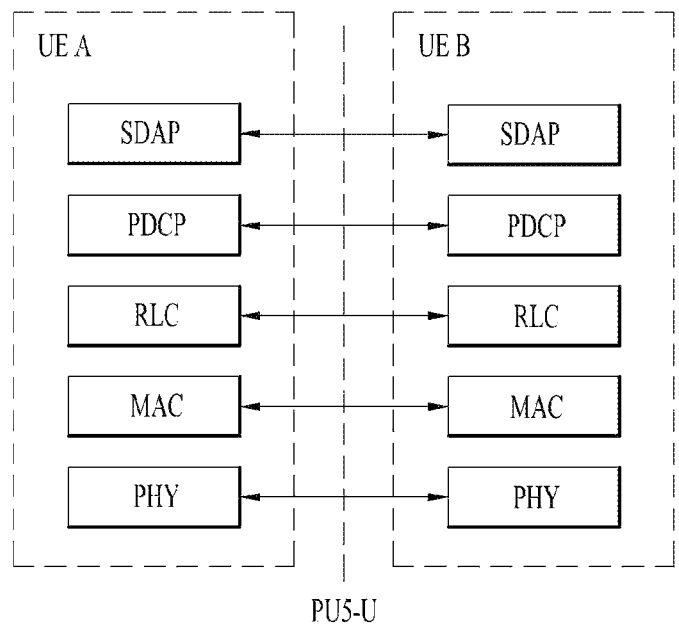
FIG. 6 illustrates a radio protocol architecture for SL communication.
Figure 6:
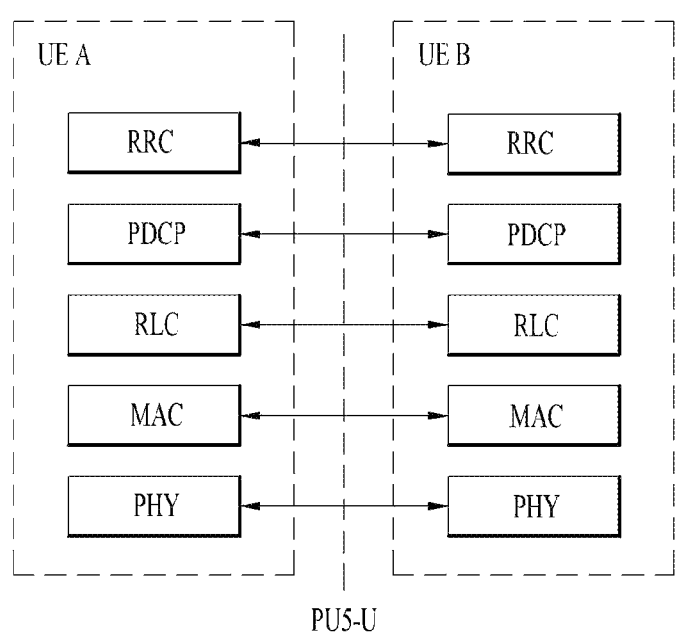

FIG. 6 illustrates a radio protocol architecture for SL communication. Specifically, FIG. 6-(a) shows a user plane protocol stack of NR, and FIG. 6-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
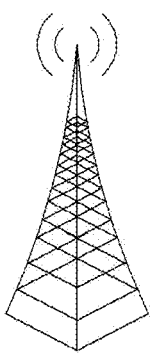
FIG. 7 illustrates UEs performing V2X or SL communication.
Figure 7:
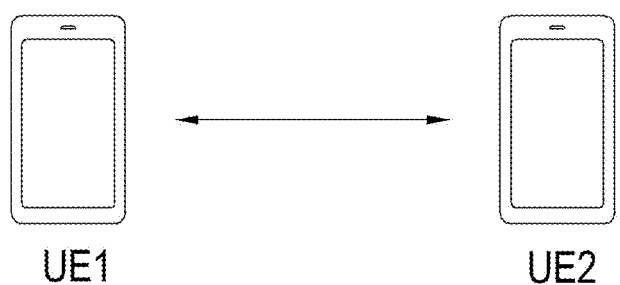

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
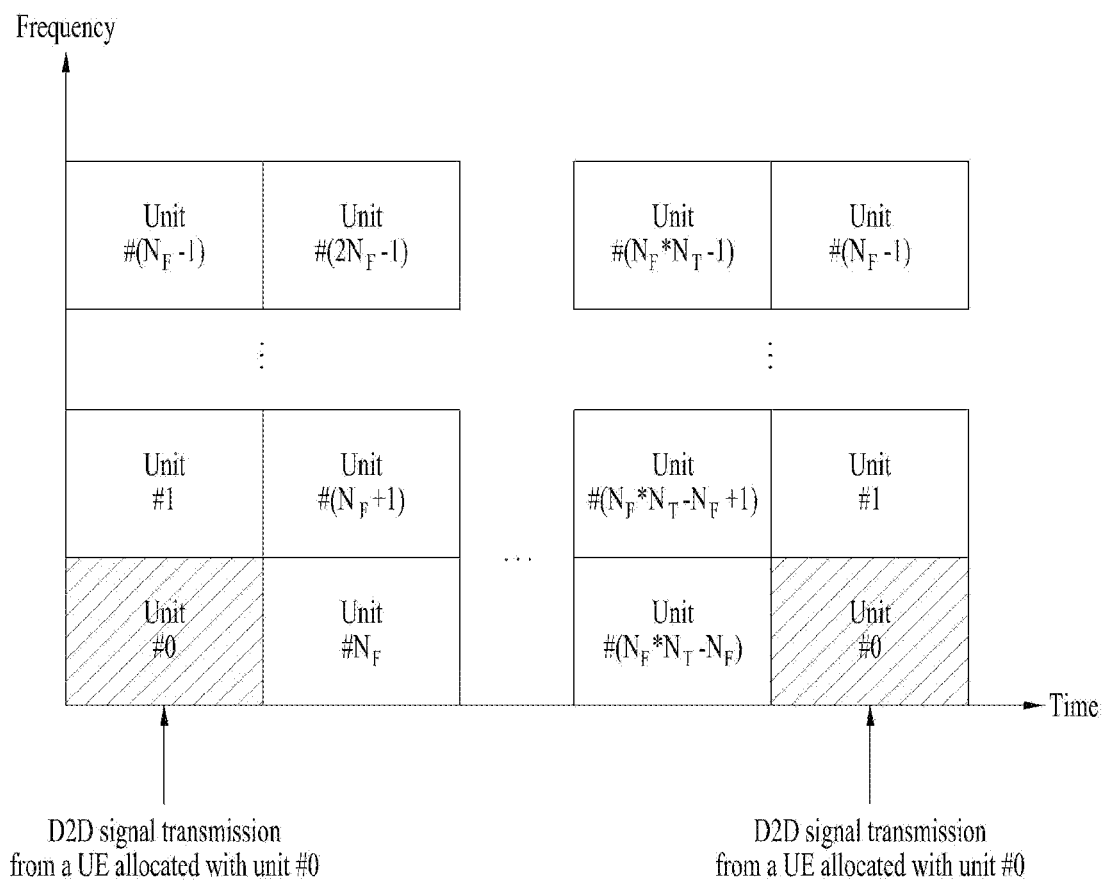
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 9:
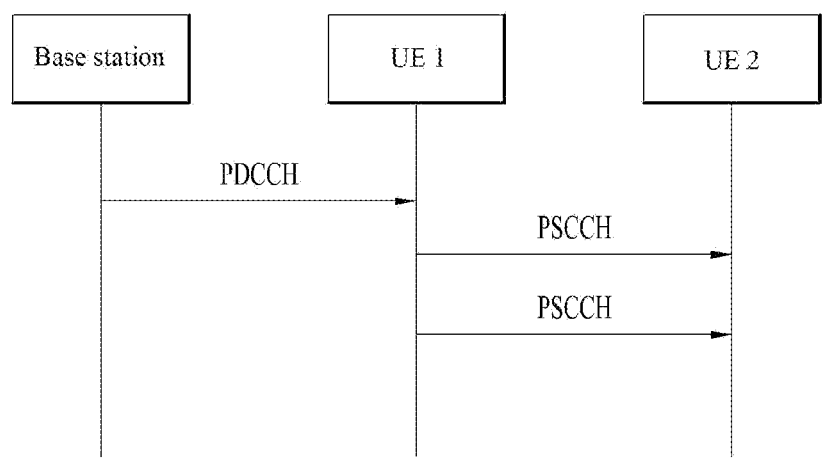
FIG. 9 illustrates a procedure in which UEs perform V2X or SL communication according to a transmission mode.
Figure 9:
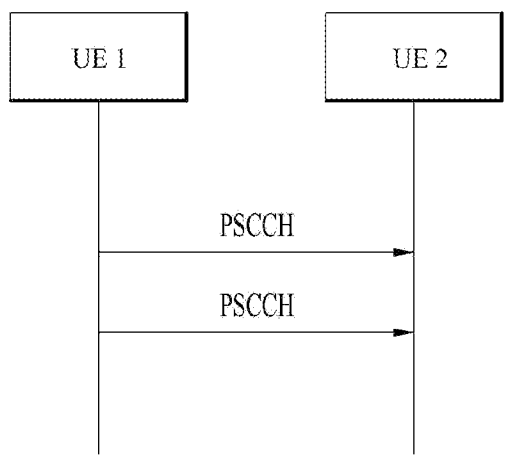

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(a) illustrates a UE operation related to LTE transmission mode 1 or LTE transmission mode 3. Alternatively, for example, FIG. 9-(a) illustrates a UE operation related to NR resource allocation mode 1. For example, LTE transmission mode 1 may be applied to general SL communication, and LTE transmission mode 3 may be applied to V2X communication.

For example, FIG. 9-(b) illustrates a UE operation related to LTE transmission mode 2 or LTE transmission mode 4. Alternatively, for example, FIG. 9-(b) illustrates a UE operation related to NR resource allocation mode 2.

Referring to FIG. 9-(a), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at $T1 \geq 0$. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

PSSCH and/or PSCCH related resource allocation information, for example, the positions/number of time/frequency resources, resource reservation information (e.g., periodicity); and/or SL CSI report request indicator or SL (L1) RSRP (and/or SL (L1) RSRQ and/or SL (L1) RSSI) report request indicator; and/or SL CSI transmission indicator (or SL (L1) RSRP (and/or SL (L1) RSRQ and/or SL (L1) RSSI) information transmission indicator) (on PSSCH); and/or MCS information; and/or transmit power information; and/or L1 destination ID information and/or L1 source ID information; and/or SL HARQ process ID information; and/or new data indicator (NDI) information; and/or redundancy version (RV) information; and/or (transmission traffic/packet related) QoS information; e.g., priority information; and/or SL CSI-RS transmission indicator or information on the number of (transmitted) SL CSI-RS antenna ports;

Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Hybrid Automatic Repeat Request (HARQ) is the combination of FEC and ARQ, and can improve performance by checking whether data received by a physical layer contains an error that cannot be decoded, and requesting retransmission if an error occurs.

In case of sidelink unicast and groupcast, HARQ feedback and HARQ combining in a physical layer may be supported. For example, when an Rx UE operates in resource allocation mode 1 or 2, the Rx UE may receive PSSCH from a Tx UE, and the Rx UE may transmit HARQ-ACK feedback on the PSSCH to the Tx UE using a Sidelink Feedback Control Information (SFCI) format through Physical Sidelink Control Channel (PSFCH).

When side link HARQ feedback is enabled for unicast, in case of a non-Code Block Group (non-CBG) operation, when the Rx UE successfully decodes a corresponding transport block, the Rx UE may generate HARQ-ACK. Then, the Rx UE may transmit the HARQ-ACK to the Tx UE. After the Rx UE has decoded an associated PSCCH targeting the Rx UE, if the Rx UE fails to successfully decode the corresponding transport block, the Rx UE may generate HARQ-NACK. Then, the Rx UE may transmit the HARQ-NACK to the Tx UE.

When side link HARQ feedback is enabled for groupcast, a UE may determine whether to send HARQ feedback based on a Tx-Rx distance and/or RSRP. In case of a non-CBG operation, two kinds of options may be supported.

(1) Option 1: When an Rx UE fails to decode a corresponding transport block after decoding an associated PSCCH, the Rx UE may transmit HARQ-NACK on PSFCH. Otherwise, the Rx UE may not transmit a signal on PSFCH.

(2) Option 2: When an Rx UE successfully decodes a corresponding transport block, the Rx UE may transmit HARQ-ACK on PSFCH. When the Rx UE fails to decode the corresponding transport block successfully after decoding an associated PSCCH targeting the Rx UE, the Rx UE may transmit HARQ-NACK on PSFCH.

In case of mode 1 resource allocation, the time between HARQ feedback transmission on PSFCH and PSSCH may be set (in advance). In case of unicast and groupcast, if retransmission in sidelink is required, it may be indicated to a BS by an in-coverage UE that uses PUCCH. A Tx UE may transmit an indication to a serving BS of the Tx UE in a form such as a Scheduling Request/Buffer Status Report (SR/BSR) rather than a form of HARQ ACK/NACK. In addition, even if the BS does not receive the indication, the BS may schedule a side link retransmission resource to the UE.

In case of mode 2 resource allocation, the time between HARQ feedback transmission on PSFCH and PSSCH may be set (in advance).

Hereinafter, sidelink congestion control will be described.

When a UE determines a sidelink Tx resource by itself, the UE also determines a size and frequency of a resource used by the UE. Of course, due to constraints from a network, etc., using a resource size or frequency of a predetermined level or higher may be limited. However, when all UEs use relatively large resources in a situation that many UEs are concentrated in a specific area at a specific timing, overall performance may be considerably due to mutual interference.

Accordingly, a UE needs to observe a channel situation. If it is determined that an excessive amount of resources are being consumed, it is preferable that the UE takes an operation in the form of reducing its own resource use. In the present specification, this may be defined as Congestion Control (CR). For example, a UE may determine whether the energy measured in a unit time/frequency resource is equal to or higher than a predetermined level, and adjust an amount and frequency of its Tx resource according to a ratio of the unit time/frequency resource from which the energy equal to or higher than the predetermined level is observed. In the present specification, the ratio of the time/frequency resources from which the energy equal to or higher than the predetermined level is observed may be defined as a Channel Busy Ratio (CBR). The UE may measure the CBR with respect to a channel/frequency. Additionally, the UE may transmit the measured CBR to a network/BS.

Tx/Rx Beam Sweep

In case of using a very high frequency such as mmWave, beamforming may be used to overcome pathloss in general. To use beamforming, a best beam pair should be detected from several beam pairs between a Tx end and an Rx end. Such a process may be referred as beam acquisition or beam tracking from the perspective of the Rx end. Particularly, since mmWave uses analog beamforming, a vehicle may need to perform beam sweeping of switching a beam to a different direction in a different time using an antenna array of the vehicle in the course of beam acquisition or beam tracking.

A6 GHz Band Tx Resource Indication Supported by b6 GHz Band Signal

In NR V2X, vehicle communication on a mmWave frequency band (or above 6 GHz (A6 GHz) band) as well as on a 5.9 GHz ITS band (or bellow 6 GHz (B6 GHz) band) may be also considered. Yet, vehicle communication through the mmWave frequency band has a short signal arrival distance compared to vehicle communication through the 5.9 GHz ITS band, which is a low frequency band, or communication with a BS on the 2-3 GHz band. In this respect, proper Tx/Rx beam pair management is essential to obtain a beam gain based on Tx/Rx beam pairing. Yet, in case that a beam pair is mismatched, that it is unable to further overcome a coverage narrowed on a high frequency band through a beam gain as a UE-to-UE distance increases, and/or that a communication link quality is lowered due to UE-to-UE blocker generation, it may be difficult to secure a consistent signal quality of mmWave band communication through a mmWave band standalone operation. In addition, when a signal quality is degraded (i.e., link failure), a considerable time delay may occur until recognition of the signal quality degradation situation or recovery to a normal operation in the signal quality degradation situation.

To solve/relieve such a problem, proposed in the following are a method of performing some signals/channel transmission/reception for vehicle communication on a mmWave band through a low frequency band (i.e., a 5.9 GHz ITS band, a Uu band in a 2-3 GHz band, and a b6 GHz band) and a method of vehicle communication on a mmWave band with the help of a low frequency band signaling (1,2,3, and/or 4).

1. Transmission of Information on a Tx Resource for a Signal to be Transmitted on a mmWave Band and/or Information on a Tx/Rx Beam on a Low Frequency Band Information on a Tx resource for a signal to be transmitted on a mmWave band and/or information on a Tx/Rx beam may be transmitted on a low frequency band. Specifically, for some signals transmitted (to be transmitted) on a mmWave band, information on Tx resources (e.g., time, frequency, and/or Tx/Rx beams) of a corresponding TDMed/FDMed signal may be indicated through signaling (at a time, or separately for each signal) may be indicated through signaling transmitted on a low frequency band. For example, the information on the Tx resource may include a location (start point/end point/size) of a time/frequency resource and/or Tx/Rx beam information (e.g., beam index, index/indicator of a beam measurement RS Tx resource).

(1) Here, one example of the "some signals transmitted (to be transmitted) on the mmWave band" is as follows, and the following example may correspond to the some signals entirely or in part.

Specifically, the some signals may include some or all of: (a) a signal/RS (e.g., Sidelink-Synchronization Signal Block (S-SSB), Channel State Information Reference Signal (CSI-RS), discovery message) (transmitted on a mmWave band) for the purpose of beam measurement; (b) a data (PSSCH) (transmitted on a mmWave band); (c) a timing and/or phase tracking RS (transmitted on a mmWave band); (d) a signal transmitted on a mmWave and/or low frequency band but for a reporting of channel/beam measurement (performed on the mmWave band); (e) an HARQ (Hybrid Automatic Repeat Request) ACK/NACK response, or an HARQ ACK/NACK response transmitted on a mmWave band and/or a low frequency band (or, transmitted, but) for PSCCH and/or PSSCH transmitted on the mmWave band; and (f) a processing time (e.g., a time taken for control/data decoding, a result calculation for a measured RX, etc.) or a processing time transmitted on a mmWave and/or low frequency band (or, transmitted, but) for PSCCH/PSSCH/RS transmitted on the mmWave band.

Meanwhile, in the combination of all/some of the signals scheduled with a single SCI, at least the data (PSSCH) (transmitted on the mmWave band) may be transmitted by maintaining a fixed single Tx/Rx beam pair.

(2) Or, the 'signaling transmitted on a low frequency band' may be transmitted in a manner of being included in (i.e., piggybacked on) Sidelink Control Information (SCI), Downlink Control Information (DCI), and/or PSSCH transmitted on a low frequency band.

(3) Meanwhile, to indicate Tx resources for the signals described in '(1)', parameters of the following example may be transmitted by being included in SCI.DCI, and/or PSSCH. Although the parameters may be transmitted through signaling transmitted on a low frequency band, it may be also possible for them to be transmitted through mmWave-band signaling (e.g., SCI, DCI, and/or PSSCH).

Specifically, the parameters defined in the following ①, ②, ③, ④, and/or ⑤ may be delivered or transmitted through signaling on a low frequency band.

① (Particularly, regarding (1)-(a)): i) the number of signal/RS (e.g., S-SSB, CSI-RS, discovery message) resources for beam measurement; ii) the repetition count of signal/RS transmitted on signal/RS (e.g., S-SSB, CSI-RS, discovery message) resources for the same beam measurement; iii) an indicator (e.g., repetition=on/off) indicating a presence or non-presence of repetitive transmission of a signal/RS transmitted on signal/RS (e.g., S-SSB, CSI-RS, discovery message) resources for the same beam measurement; iv) a time required for calculating/processing a measured values for a signal/RS after signal/RS transmission for a beam measurement; and v) an indicator classifying what is going to be performed through RS/signal transmission for the corresponding beam management is a coarse-level beam search/selection or a fine-level beam search/selection Here, regarding 'v)', references for the classification of a coarse-level and a fine-level may include 'beam width', 'number of candidate beams', 'whether to select a panel or a beam in a selected panel', 'an extent of spatial distribution of candidate beams (e.g., a selection from candidate beams spread at 360 degrees, and/or a selection from candidate beams in a specific spatial area)', and the like. For example, at the coarse-level, one/some preferred beams may be selected from candidate beams having wider beam widths/candidate beams distributed in a wider area/multiple candidate beams. At the fine-level, one/some candidate beams may be selected as real Tx/Rx beam(s) from candidate beams having narrower widths/candidate beams distributed in a narrower area/a small number of candidate beams.

② (Particularly, regarding (1)-(b)): i) number of (consecutive) data Tx symbols/slots/subframes; ii) data Tx RB location (e.g., start point/end point/RB number, etc.); iii) MCS, and/or iv) time taken for calculation/processing required for data decoding ③ (Particularly, regarding (1)-(c)): i) timing and/or location (time/frequency) of phase tracking RS Tx resource and/or Tx/Rx beam information (e.g., an index/indicator of a beam/panel/beam group/antenna port group or an index/indicator of a resource mapped to a beam/panel/beam group/(physical or logical) antenna port group); and ii) possible necessity for transmission in a direction from an Rx UE to a Tx UE in consideration of performing measurement reporting and/or HARQ feedback despite that a time tracking RS may need transmission of a data packet in a direction from the Tx UE to the Rx UE ④ (Particularly, regarding (1)-(d)): i) location (time/frequency) of Tx resource of a report on channel/beam measurement and/or Tx/Rx beam information (e.g., an index/indicator of a beam/panel/beam group/(physical or logical) antenna port group or an index/indicator of a resource mapped to a beam/panel/beam group/(physical or logical) antenna port group); ii) an (1-bit) indicator indicating that it will make a report according to 'location (time/frequency) of a Tx resource for a reporting on previously agreed/signaled/configured measurement and Tx/Rx beam information'; iii) a measurement value (e.g., RSRP (Reference Signal Received Power), RSRQ (Reference Signal Received Quality), SNR (Signal Noise Ratio) or SINR (Signal to Interference plus Noise Ratio)) for a beam management RS and an indicator/index (e.g., S-CSI-RS RI, S-SSB RI) of an RS resource from which the measurement value was measured; and/or iv) (in case of a UE having a distributed antenna/panel) a measurement value (e.g., RSRP, RSRQ, SNR, SINR) measured from a specific panel/(physical or logical) antenna port group/beam group and an indicator/index of a panel/(physical or logical) antenna port group/beam group from which the measurement value was measured (and/or an index/indicator of a resource mapped to a panel/antenna group/beam group))

⑤ (Particularly, regarding (1)-(e)): i) location (time/frequency) of HARQ feedback Tx resource and/or Tx/Rx beam information (e.g., an index/indicator of a beam/panel/beam group/(physical or logical) antenna port group or an index/indicator of a resource mapped to a beam/panel/beam group/(physical or logical) antenna port group)

(4) Meanwhile, an SCI format may differ according to a type of a signal/channel/operation of A6 GHz band indicated by low frequency band signaling (or a type/combination of a signal included in a Tx resource scheduled (at a time) by a corresponding SCI). Namely, a type of a signal/channel/operation of A6 GHz band (or a type/combination of a signal included in a Tx resource scheduled (at a time) by a corresponding SCI) may be linked to the SCI format.

Specifically, (a) SCI format 0 may mean/instruct that initial beam acquisition (or discovery) is triggered in A6 GHz band (or may be mapped to indicate a signal/RS Tx resource (time/frequency/beam) required for the above operation). (b) In addition, when an SCI format may be configured differently according to the type of signal/channel/operation scheduled in the A6 GHz band as described above, a UE may have to transmit an SCJ format indicator in a manner that the SCI format indicator (an indicator indicating an SCI format linked to a prescribed signal/channel/operation) is included in an SCI as a partial parameter. That is, the SCI format indicator may be transmitted through the SCI together with the parameters described in '(3)'.

(5) In addition, when a data Tx resource to be transmitted on a mmWave band is indicated or a data Tx resource to be transmitted on a mmWave band using a signal transmitted on a low frequency band or a signal (e.g., SCI/DCI) transmitted on the mmWave band is indicated, information on multiple contiguous data Tx slots (aggregated slots) or information on contiguous data Tx resources s may be indicated.

Specifically, the scheduled aggregated slots may be indicated together with SCI or indicated by including the number of PSSCH transmissions transmitted without SCI. In this case, a Tx resource for the SCI may be transmitted in a manner of being filled with data.

'(Maximum) size of contiguous data Tx resources' that can be scheduled with a single SCI may be determined based on the following values. Here, '(maximum) size of contiguous data Tx resources' may be determined dynamically by an individual UE or configured by a network. In addition, '(maximum) size of contiguous data Tx resources' may be a value/parameter configured differently per carrier/resource pool/BWP.

'(Maximum) size of contiguous data Tx resources' may be determined by considering at least one of the following i) to vi).

a) An Rx signal measurement/calculation value of a UE or repot information (e.g., RSRP, SNR, SINR, RSRQ) on the value.
    b) Congestion level of Tx resource
    c) Absolute/relative driving speed of vehicle
    d) Distance and/or (relative) driving direction between Tx UE and Rx UE communication range)
    e) Type/requirements/priority of service (e.g., latency, reliability, required communication range)
    f) Tx beam width Yet, the above-described 'contiguous data Tx resources' may mean continuity in the rest of symbols/slots except some symbols/slots that should be emptied for the purpose of measurement reporting (e.g., beam/channel measurement, measurement reporting on RLM), HARQ feedback, RX (periodic/aperiodic) transmission/reception, and/or processing time securing. Or, although contiguous data Tx resources are scheduled, if the signal transmission/reception and/or the processing time securing is necessary, a corresponding resource (or contiguous data Tx resources) may be restricted from being used for the purpose of data transmission/reception.

(6) Meanwhile, 'scheduling a Tx resource of feedback for signal/channel/RS transmission (measured in the mmWave band despite being transmitted on the mmWave band or a low frequency band) and/or a Tx resource of measurement reporting' described in '(1)' may be construed as directly indicating a location of the Tx resource or enabling a Tx/Rx UE to predict the Tx resource based on a previously agreed/configured rule.

For example, UEs, which transmit/receive feedback/report performed through low frequency band signaling, may exclude a resource (time/frequency) of B6 GHz band, on which the feedback/report is scheduled or predicted to be transmitted/received, from being used for transmission/reception of another service/channel/signal through B6 GHz band, or allow the resource to be used more preferentially for it than the transmission/reception. (i.e., in the resource selection for another service/channel/signal transmission, the resource is construed/regarded as an unavailable resource and may be excluded from a resource selection candidate or unselected.)

The above-described method may be effective in securing robustness for signal transmission required for control information and/or beam management for a mmWave band signal. Namely, robustness for beam management is secured by utilizing a wide coverage of a lower frequency band, whereby higher reliability of signal transmission/reception can be secured.

2. Performing Measurement Reporting and/or HARQ Feedback on a mmWave Band Using Low Frequency Band Signaling It may be possible to perform a measurement reporting and/or HARQ feedback, etc. on a mmWave band using low frequency band signaling. Here, the measurement reporting may relate to (beam related) RSRP reporting, beam failure announcement, and beam failure recovery request.

Specifically, when an abnormality occurs in a link/signal quality in a mmWave band, the abnormality of the quality may occur due to a beam failure attributed to a problem of beam pairing itself, DTX, or NACK situation. In this case, it may be advantageous to use low frequency band signaling to quickly recognize the problem of the quality abnormality and perform a normal operation (through beam recovery or data ReTx (or retransmission)). In addition, when a measurement report/feedback is transmitted over a low frequency band, the corresponding signaling (from the perspective of a single UE) has the advantage of being able to transmit and receive other signals (RS/Control/data, etc.) on A6 GHz band (i.e., it can be interpreted as operating in the form of an inter-band CA, so there is no half-duplex problem between two carriers).

After a UE or BS has determined a next operation (e.g., beam measurement RS transmission, ReTx, etc.) based on the report/feedback value (e.g., RSRP, ACK/NACK), the UE/BS may transmit an SCI/DCI for scheduling signals required for performing the corresponding operation. In this case, the SCI/DCI may be utilized/construed as an acknowledgement message in repose to the report/feedback sent in advance by a counterpart UE together with then scheduling of the Tx resource required for the corresponding operation (e.g., beam measurement RS transmission, ReTx, etc.). Alternatively, an approval message for report/feedback reception may be defined separately (from the SC?DCI for scheduling the signals required for performing the corresponding operation), and the approval message may be transmitted ahead of the SCI/DCI transmission.

In performing the above-described operation, a separate message may be defined for the purpose of performing measurement reporting/feedback on a mmWave band through low frequency band signaling. A priority (e.g., PPPP) and/or requirements (e.g., latency, reliability, required communication range) of the separate message may be configured to be the same as a priority of a service supported through a data packet transmitted on the mmWave band. (Or, it may be the same or lower priority configuration, or the same or longer latency/lower reliability/short required communication range requirement configuration.) In other words, the priority of the separate message may be configured based on the priority of the service supported through the data packet transmitted on the mWave band.

Here, since the priority of the separate message is determined based on the priority of the service provided or supported through the data packet, a Tx resource for the feedback information may be allocated based on contention based Tx resource allocation (or sensing based Tx resource allocation) for the feedback information on the basis of the priority of the separate message.

On the other hand, measurement reporting and/or HARQ feedback on the mmWave band through low frequency band signaling are performed in principle, but in some cases like the following cases, measurement reporting/feedback through mmWave band signaling may be allowed/attempted exceptionally (or, reporting/feedback may be attempted/allowed in both low frequency and mmWave bands). Here, the measurement reporting on the mmWave band may include a (beam related) RSRP report, a beam failure announcement, or a beam failure recovery request.

Specifically, the measurement reporting and/or HARQ feedback on the mmWave band may be performed in the mmWave band, if: i) a congestion level of a low frequency band is high (e.g., when a CBR is equal to or greater than a specific preset threshold); ii) a problem occurs when feedback is transmitted on a low frequency band at a transmittable timing; or iii) a data packet to be sent in the direction in which feedback/reporting should be performed in the mmWave band is generated (i.e., a transmission timing of the corresponding data packet is ahead of a transmission timing of a transmittable resource that can be secured in a low frequency band).

Here, "ii)" may be a case in which it is determined that it is difficult to satisfy a service requirement or a maximum feedback/reporting allowable delay time (e.g., a case that a preconfigured timer is predicted to expire when the above-described measurement reporting and/or HARQ feedback is performed in the low frequency band).

3. Performing Measurement Reporting and/or Feedback on mmWave Band

As an alternative to the method described in "2", the measurement reporting and/or HARQ feedback and the like on the mmWave band through signaling in the mmWave band is basic (or, in principle), but measurement reporting and/or HARQ feedback on the mmWave band through low frequency band signaling may be exceptionally allowed or possible only if it is determined as some inevitable situations. Here, the measurement reporting may include a (beam related) RSRP report, a beam failure announcement, and/or a beam failure recovery request.

The above-described method may have the advantage in minimizing the dependence of the mmWave band operation on the low frequency band, so that it is possible to design an operation as close to the mmWave band standalone as possible. Measurement reporting/HARQ feedback and the like in the mmWave band may be piggybacked on the PSSCH transmitted on the mmWave band and transmitted together at the corresponding PSSCH transmission timing, or may be transmitted through a feedback channel (e.g., PSFCH) in the mmWave band.

The above-described "some inevitable situations" may include: i) a case that there is a maximum time delay limit in which feedback/reporting should be made, and that the feedback/reporting is impossible within in the mmWave band (because it is impossible to secure Tx resources (time/frequency/Tx-Rx beam pair); ii) a case that it is determined that requirements (e.g., latency, reliability, communication range, etc.) of a corresponding service cannot be satisfied when feedback/reporting is performed in the mmWave band; and/or iii) a case that there is no data packet to be sent in a direction (i.e., Rx UE of data→Tx UE of data) in which feedback/reporting should be performed in the mmWave band (particularly, a case that there is no data packet to be sent during a specific time interval (e.g., a maximum time delay allowed for feedback/reporting, latency requirements)).

4. Measurement Reporting and/or HARQ Feedback Timing on mmWave Band

Meanwhile, in performing the measurement reporting/feedback described in "2" and "3", the relationship between "measurement reporting timing and measurement RS Tx/Rx timing (linked thereto)" and/or the relationship between "PSCCH/PSSCH Tx/Rx timing and HARQ feedback timing (linked thereto)" may be as follows.

(1) Measurement reporting and/or HARQ feedback for the mmWave band may be transmitted at a specific timing agreed/configured in advance or signaled from a BS/counterpart UE (e.g., [x] symbol/slot/msec) (through b6 GHz or a6 GHz band) with reference to the end of measurement RS or PSCCH/PSSCH transmission (or a Tx start/last symbol/slot). At the transmission timing time of transmission, an ACK/NACK response to data and/or control (scheduled with or previously transmitted ahead of the corresponding measurement RS) may be transmitted as well.

(2) Alternatively, measurement reporting and/or HARQ feedback for the mmWave band may be transmitted (through a low frequency band or mmWave band) at a previously agreed/configured timing or a timing defined according to a reporting cycle signaled from a BS/counterpart UE. Among the periodically defined timings, the earliest timing after securing a processing/computation time for measurement, and/or a timing indicated by the BS/counter UE may be selected as an actual reporting timing.

(3) Alternatively, even if there is a timing determined like "(1)" and "(2)", transmission and reception of other channels/signals may be required (exceptionally) at the determined timing. In this case, measurement reporting and/or HARQ feedback on a mmWave band may be transmitted (through a low frequency band or a mmWave band) at a previously agreed/configured based on an end timing of another channel/signal transmission by avoiding transmission/reception of another channel/signal, a timing signaled from a BS/counterpart UE, and/or a periodic reporting timing earliest from it (or the transmission end timing).

For example, other channels/signals, which need to be avoided when measurement reporting and/or HARQ feedback on a mmWave band is transmitted over the mmWave band, may be transmitted and received for the data scheduled with the corresponding measurement RS. (As there is a Tx timing collision with another channel/signal, if transmission is performed by avoiding the corresponding timing, a Tx/Rx switching gap may be required.)

Figure 10:
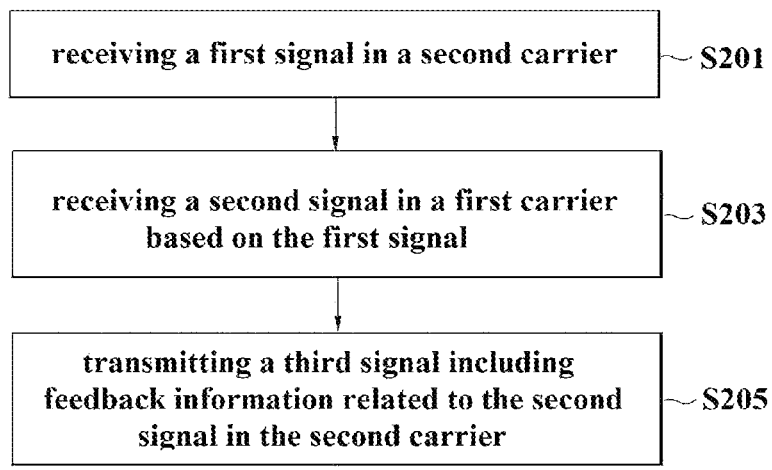
FIG. 10 is a diagram to describe a method of transmitting feedback information by a first UE.

FIG. 10 is a diagram to describe a method of transmitting feedback information by a first UE.

Referring to FIG. 10, a first UE may receive a first signal including resource allocation information or scheduling information on a signal to be transmitted on a first carrier from a second UE, which is a counterpart UE, over a second carrier or on the second carrier [S201]. Here, the first carrier may have a higher frequency band than the second carrier, and may include a carrier in a mmWave frequency band or a frequency band of A6 Ghz. In addition, the second carrier may include a carrier in a 5.9 GHz ITS band, a Uu band in a 2-3 GHz band, or a b6 GHz frequency band. That is, the first UE may receive resource allocation information on a signal, which is to be transmitted on the first carrier in a high frequency band, on the second carrier (i.e., a carrier in a low frequency band) which is a frequency band lower than the first carrier.

Alternatively, the first signal including the resource allocation information may be a signal including SCI (and/or DCI) transmitted over the second carrier, or a PSSCH on which the resource allocation information is piggybacked and transmitted over the second carrier.

Alternatively, the resource allocation information may include resource scheduling information on at least one of signal/RS for the beam measurement purpose to be transmitted on the first carrier (or a carrier in the mmWave band), data (PSSCH), timing, and/or phase tracking RS. Alternatively, the resource allocation information may include resource scheduling information on at least one of a report on channel/beam measurement transmitted on the first carrier (or a carrier in the mmWave band), HARQ ACK/NACK response to PSCCH and/or PSSCH, and processing time for PSCCH/PSSCH/RS.

Next, the first UE may receive a second signal including the data and/or a reference signal (reference signal for beam management, TRS, etc.) on the first carrier in the mmWave band based on the resource allocation information [S203]. In this case, the first UE may calculate a measurement value for the reference signal or decode the received data.

Next, the first UE may transmit a third signal including a measurement report on the measurement value for the reference signal and/or feedback information on HARQ feedback (ACK/NAK) on the received data on the second carrier [S205]. Here, the third signal may be transmitted over the second carrier, which is a low frequency band, even with respect to a measurement value or HARQ feedback for the signal transmitted on the first carrier. This is to ensure robustness for beam management formed in the first carrier through transmission of feedback information using the second carrier in the low frequency band having relatively wide coverage, thereby ensuring high reliability of transmission and reception of signals or messages on the first carrier.

Alternatively, the third signal may be transmitted in a resource pool preconfigured for the PSCCH in relation to the second carrier. That is, a Tx resource for the third signal may be selected or allocated based on sensing or contention in the resource pool based on a priority configured in relation to the feedback information.

Alternatively, the measurement report may include a report on at least one of a Reference Signal Received Power (RSRP) measurement report, a beam failure announcement, and/or a beam failure recovery request on the first carrier.

Alternatively, the priority of the message related to the feedback information may be configured based on the priority of the service supported through the data included in the second signal or the data packet. Here, the message including the feedback information or related to the feedback information may be a message defined separately to be distinguished from a type of an existing message, a priority of the separately defined message may need to be configured to perform a contention-based resource allocation method in the second carrier, and it may be configured by being linked to the priority of the service according to the data packet.

Alternatively, the first UE transmits the third signal on the second carrier in principle, and may change a carrier on which the third signal will be transmitted into the first carrier from the second carrier based on at least one of a presence or non-presence of generation of data to be transmitted on the first carrier, requirements of the service related to the data or the data packet included in the second signal, and a Channel Busy Ratio (CBR) of the second carrier. So to speak, if at least one of the requirements of the service related to the data and the CBR of the second carrier meets a prescribed condition, the first UE may change the carrier on which the third signal will be transmitted into the first carrier from the second carrier.

Specifically, if the CBR for the second carrier is equal or greater than a preset threshold or the transmission of the third signal over the second carrier fails to meet a delay condition for the service, the carrier on which the third signal will be carrier may be exceptionally changed into the first carrier form the second carrier. Alternatively, when Tx data to be transmitted on the first carrier by the first UE to the second UE as a counterpart UE is generated, if a time for transmitting the Tx data is earlier than a time of a time resource secured in the second carrier, the carrier on which the third signal will be transmitted may be changed into the first carrier from the second carrier.

Alternatively, based on at least one of a presence or non-presence of generation of data to be transmitted on the first carrier, requirements of the service related to the data, and a Channel Busy Ratio (CBR) of the second carrier, the third signal may be transmitted on the first carrier as well as on the second carrier. For example, if the CBR for the second carrier is equal or greater than a preset threshold or the transmission of the third signal over the second carrier fails to meet a delay condition for the service, the third signal may be transmitted on the first carrier and/or the second carrier. Alternatively, when data to be transmitted on the first carrier to the second UE is generated, if a time for transmitting the data is earlier than a time of a time resource secured in the second carrier, the third signal may be transmitted on each of the second carrier and the first carrier.

Alternatively, the first UE transmits the third signal on the first carrier in principle, and may transmit the third signal on the second carrier exceptionally if the transmission of the third signal on the first carrier fails to meet the delay condition of the service due to quality degradation of a link in the first carrier, beam failure and the like. Alternatively, the first UE transmits the third signal on the first carrier in principle, and may transmit the third signal on the second carrier exceptionally if it is predicted that the delay condition of the service will not be met due to the absence of a data packet to be sent to the second UE on the first carrier, the third signal may be exceptionally transmitted on the second carrier.

Alternatively, the first UE may receive scheduling information, which is related to a next operation (e.g., retransmission of the data, RS transmission for bema measurement, etc.) determined based on the feedback information included in the third signal, from the second UE. The scheduling information may be received over the second carrier. In this case, if the scheduling information is received, the first UE may use or interpret the scheduling information as an acknowledgement message for the feedback information included in the third signal. Alternatively, an approval message for the reception of the feedback information may be defined separately, and the first UE may receive the approval message from the second UE prior to the reception of the scheduling information.

Alternatively, based on at least one of requirements of the service related to the data, a presence or non-presence of generation of data to be transmitted on the first carrier, and a Channel Busy Ratio (CBR) of the second carrier, the first UE may determine a carrier on which the third signal including the feedback information will be transmitted as one of the first carrier and the second carrier. For example, if a quality of a beam pair formed in the first carrier sufficiently meets the service requirements or the CBR of the second carrier is equal to or greater than a preset threshold, the first UE may determine the carrier on which the third signal will be transmitted as the first carrier. Alternatively, if the CBR of the second carrier is smaller than a preconfigured threshold or it is predicted that the service requirements will not be met due to the degradation of the quality of the beam pair formed in the first carrier, the first UE may determine the carrier on which the third signal will be carried as the second carrier. When the third signal is transmitted on the second carrier, a priority of a message related to the feedback information may be determined based on a priority of the service related to the data.

Figure 11:
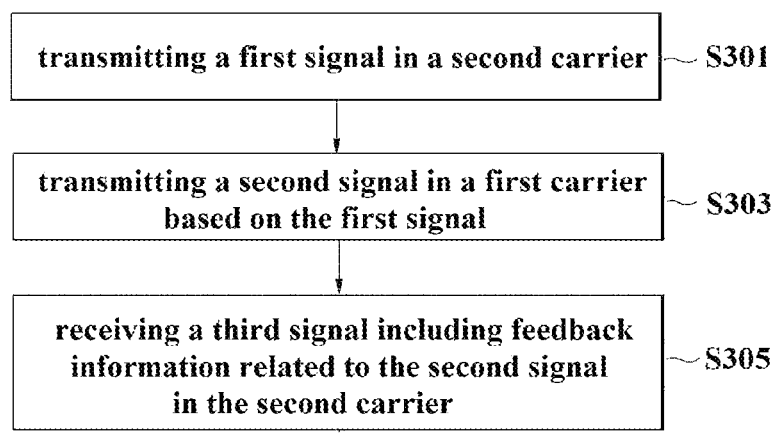
FIG. 11 is a diagram to describe a method of receiving a third signal including feedback information by a second UE.

FIG. 11 is a diagram to describe a method of receiving a third signal including feedback information by a second UE.

Referring to FIG. 11, a second UE may transmit a first signal including resource allocation information or scheduling information on a signal to be transmitted on a first carrier to a first UE, which is a counterpart UE, over a second carrier or on the second carrier [S301]. Here, the first carrier may have a higher frequency band than the second carrier, and may include a carrier in a mmWave frequency band or a frequency band of A6 Ghz. In addition, the second carrier may include a carrier in a 5.9 GHz ITS band, a Uu band in a 2-3 GHz band, or a b6 GHz frequency band. That is, the second UE may transmit resource allocation information on a signal, which is to be transmitted on the first carrier, on the second carrier that is a frequency band lower than the first carrier.

Alternatively, the first signal including the resource allocation information may be a signal including SCI (and/or DCI) transmitted over the second carrier, or a PSSCH on which the resource allocation information is piggybacked and transmitted over the second carrier.

Alternatively, the resource allocation information may include resource scheduling information on at least one of signal/RS for the beam measurement purpose to be transmitted on the first carrier (or a carrier in the mmWave band), data (PSSCH), timing, and/or phase tracking RS. Alternatively, the resource allocation information may include resource scheduling information on at least one of a report on channel/beam measurement transmitted on the first carrier (or a carrier in the mmWave band), HARQ ACK/NACK response to PSCCH and/or PSSCH, and processing time for PSCCH/PSSCH/RS.

Next, the second UE may transmit a second signal including the data and/or a reference signal (reference signal for beam management, TRS, etc.) on the first carrier in the mmWave band based on the resource allocation information [S303].

Next, the second UE may receive a third signal including a measurement report on the measurement value for the reference signal and/or feedback information on HARQ feedback (ACK/NAK) on the received data [S305]. Here, the third signal may be received over the second carrier, which is the low frequency band, even with respect to a measurement value or HARQ feedback for the signal transmitted on the first carrier.

Alternatively, the third signal may be received in a resource pool preconfigured for the PSCCH in relation to the second carrier.

Alternatively, the measurement report may include a report on at least one of a Reference Signal Received Power (RSRP) measurement report, a beam failure announcement, and/or a beam failure recovery request on the first carrier.

Alternatively, the priority of the message related to the feedback information may be configured based on the priority of the service supported through the data or the data packet included in the second signal. Here, the message including the feedback information or related to the feedback information may be a message defined separately from an existing message type related to PSCCH or PSSCH.

Alternatively, based on at least one of requirements of the service related to the data or the data packet included in the second signal, a presence or non-presence of generation of data to be transmitted on the first carrier (to be transmitted to the second UE by the first UE), and a Channel Busy Ratio (CBR) of the second carrier, the third signal may be received on the first carrier exceptionally.

Alternatively, based on at least one of requirements of the service related to the data and a Channel Busy Ratio (CBR) of the second carrier, the third signal may be received on the first carrier as well as on the second carrier.

Alternatively, the second UE may transmit scheduling information, which is related to a next operation such as retransmission of the data, RS transmission for bema measurement, etc. based on the feedback information included in the third signal, to the first UE. In this case, the scheduling information may be transmitted over the second carrier. here, the scheduling information may be transmitted over SCI or DCI. Meanwhile, the scheduling information may be utilized or used as an acknowledgement message for the feedback information included in the third signal. Alternatively, an approval message for the reception of the feedback information may be defined separately, and the second UE may transmit the approval message to the first UE prior to the transmission of the scheduling information.

For example, when a Reference Signal Received Power (RSRP) included in the measurement report is smaller than a first threshold, if information on a beam failure announcement and/or a beam failure recovery request is included, the second UE may transmit scheduling information related to RS transmission for beam measurement to the first UE over the second carrier. Alternatively, if HARQ feedback included in the measurement report is NACK, the second UE may transmit scheduling information for retransmission of the data included in the second signal to the first UE over the second carrier.

It is apparent that examples of the proposed method described above may also be included as one of the implementation methods of the present disclosure, and thus may be regarded as a sort of proposed methods. Meanwhile, the contents of the present disclosure are non-limited to UE-to-UE direct communication, and may be used in uplink or downlink, and in this case, a base station, a relay node, or the like may use the above-proposed method. In addition, a rule may be defined such that information indicating whether to apply the proposed methods (or information on the rules of the proposed methods) is notified to a UE by a base station or to an Rx UE by a Tx UE through a predefined signal (e.g., a physical layer signal or a higher layer signal).

Communication System Example to which the Present Invention is Applied

Although not limited thereto, various descriptions, functions, procedures, proposals, methods, and/or operational flow charts of the present invention disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 12:
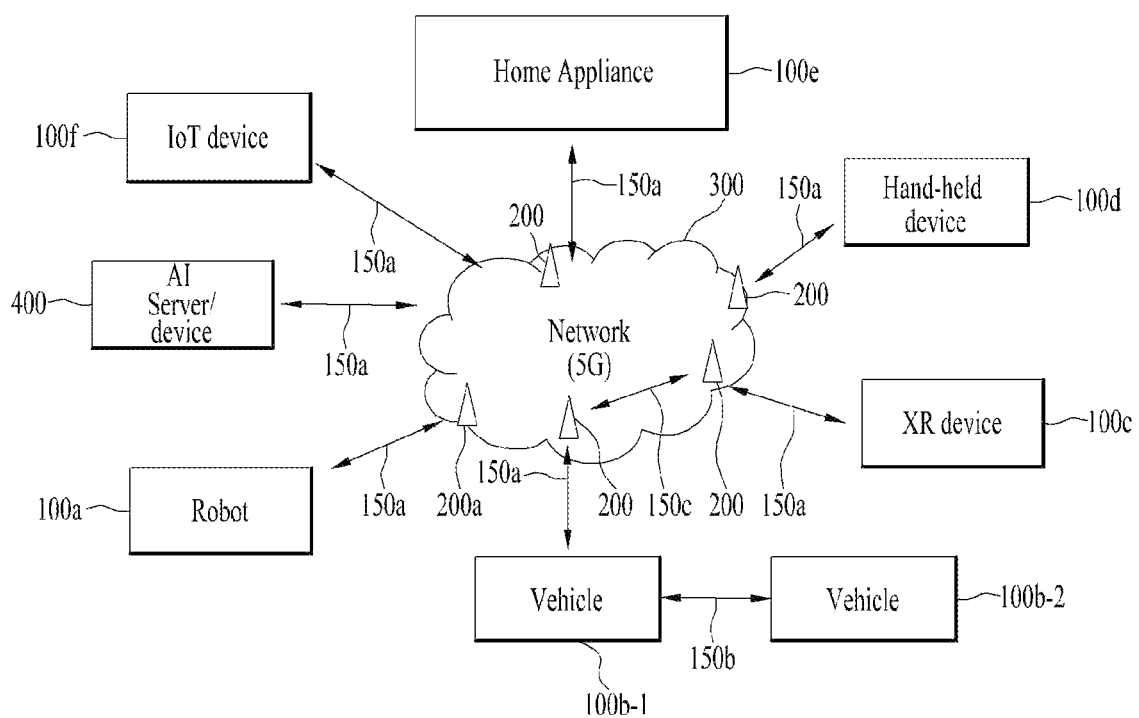
FIG. 12 illustrates a communication system applied to the present invention.

FIG. 12 illustrates a communication system applied to the present invention.

Referring to FIG. 12, a communication system 1 applied to the present invention includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR)

device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present invention.

Examples of Wireless Devices to which the Present Invention is Applied

Figure 13:
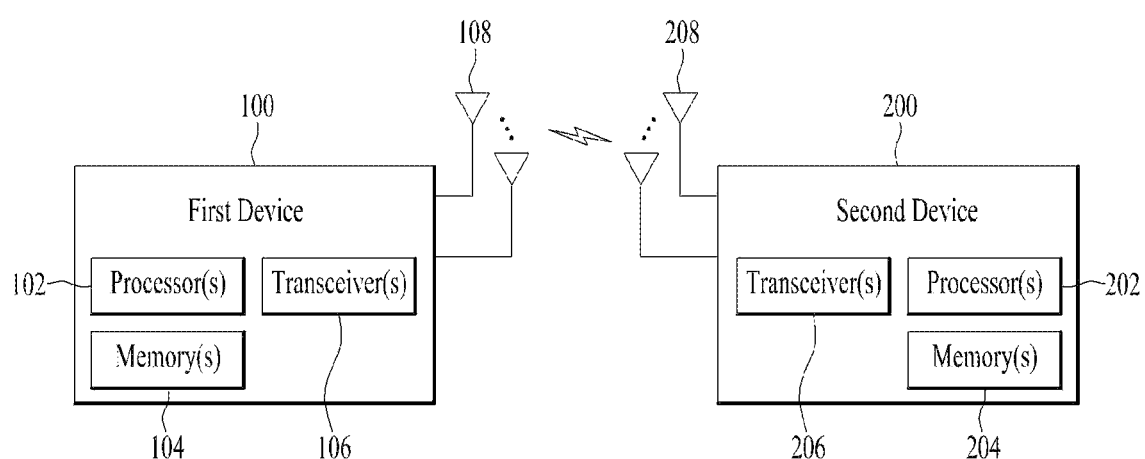
FIG. 13 illustrates wireless devices applicable to the present invention.

FIG. 13 illustrates a wireless device applicable to the present invention.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 12.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present invention, the wireless device may represent a communication modem/circuit/chip.

Specifically, the first wireless device 100 may include a processor 102 and a memory 104 connected to the RF transceiver. The memory 104 may include at least one program capable of performing operations related to the embodiments described in FIG. 10 and FIG. 11.

The processor 102 may control the RF transceiver to receive a first signal including resource allocation information on a signal, which is 1 to be transmitted on a first carrier, on a second carrier, receive a second signal including at least one of a reference signal and data on the first carrier based on the resource allocation information, and transmit a third signal including feedback information related to the second signal on the second carrier, and a priority of a message related to the feedback information may be configured based on a priority of a service related to the data. The processor 102 may perform operations of transmitting the feedback information described with reference to FIG. 10 and FIG. 11 based on a program included in the memory 104.

Alternatively, a chipset including the processor 102 and the memory 104 may be configured. In this case, a chipset includes at least one processor and at least one memory operably connected to the at least one processor and enabling the at least one processor to perform an operation when executed, the operation including receiving a first signal including resource allocation information on a signal, which is to be transmitted on a first carrier, on a second carrier, receiving a second signal including at least one of a reference signal and data on the first carrier based on the resource allocation information, and transmitting a third signal including feedback information related to the second signal on the second carrier, and a priority of a message related to the feedback information may be configured based on a priority of a service related to the data. In addition, the operation may perform operations for transmission of the feedback information described with reference to FIG. 10 and FIG. 11 based on a program included in the memory 104.

Alternatively, a computer-readable storage medium including at least one computer program enabling at least one processor to perform an operation, the operation including receiving a first signal including resource allocation information on a signal, which is to be transmitted on a first carrier, on a second carrier, receiving a second signal including at least one of a reference signal and data on the first carrier based on the resource allocation information, and transmitting a third signal including feedback information related to the second signal on the second carrier, and a priority of a message related to the feedback information may be configured based on a priority of a service related to the data. In addition, the operation may perform operations for transmission of the feedback information described with reference to FIG. 10 and FIG. 11 based on a program included in the memory 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present invention, the wireless device may represent a communication modem/circuit/chip.

Specifically, the second wireless device 200 may include a processor 202 and a memory 204 connected to the RF transceiver. The memory 204 may include at least one program capable of performing operations related to the embodiments described in FIG. 10 and FIG. 11.

The processor 202 may control the RF transceiver to transmit a first signal including resource allocation information on a signal, which is to be transmitted on a first carrier, on a second carrier, transmit a second signal including at least one of a reference signal and data on the first carrier based on the resource allocation information, and receive a third signal including feedback information related to the second signal on the second carrier, and a priority of a message related to the feedback information may be configured based on a priority of a service related to the data. The processor 202 may perform operations of receiving the feedback information described with reference to FIG. 10 and FIG. 11 based on a program included in the memory 204.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Invention is Applied

Figure 14:
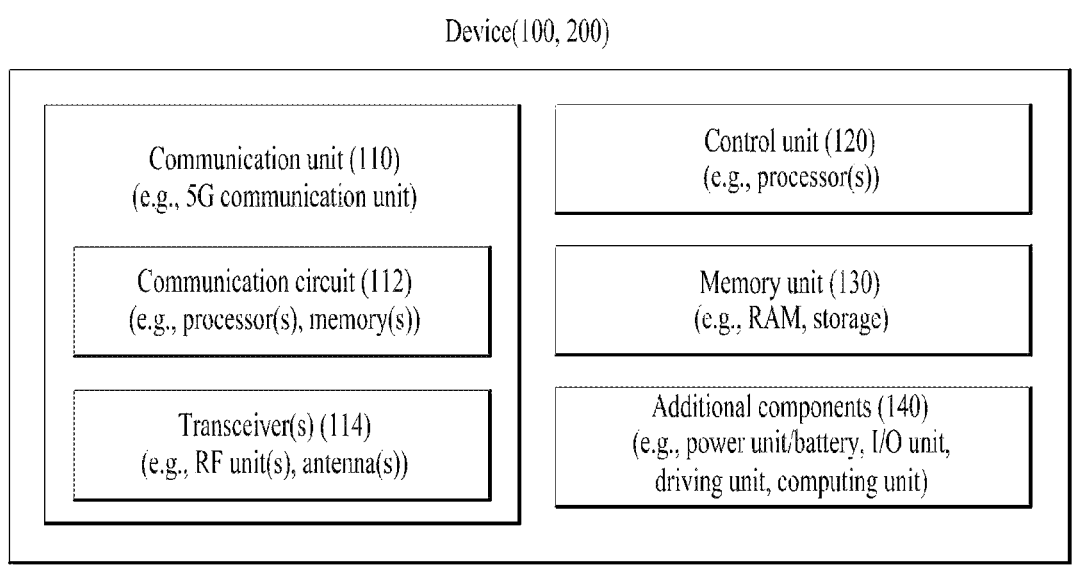
FIG. 14 illustrates another example of a wireless device to which the present invention is applied. The wireless device may be implemented in various forms according to use—examples/services.

FIG. 14 illustrates another example of a wireless device applied to the present invention. The wireless device may be implemented in various forms according to a use-case/service (refer to FIG. 12)

Referring to FIG. 14, wireless devices 100 and 200 may correspond to the wireless devices 100 and 200 of FIG. 13 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 12), the vehicles (100b-1 and 100b-2 of FIG. 12), the XR device (100c of FIG. 12), the hand-held device (100d of FIG. 12), the home appliance (100e of FIG. 12), the IoT device (100f of FIG. 12), a digital broadcast terminal, a hologram device, a public safety device, an MTC device, a medicine device, a fintech device (or a finance device), a security device, a climate/environment device, the AI server/device (400 of FIG. 12), the BSs (200 of FIG. 12), a network node, etc. The wireless device may be used in a mobile or fixed place according to a use-example/service.

In FIG. 14, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 15:
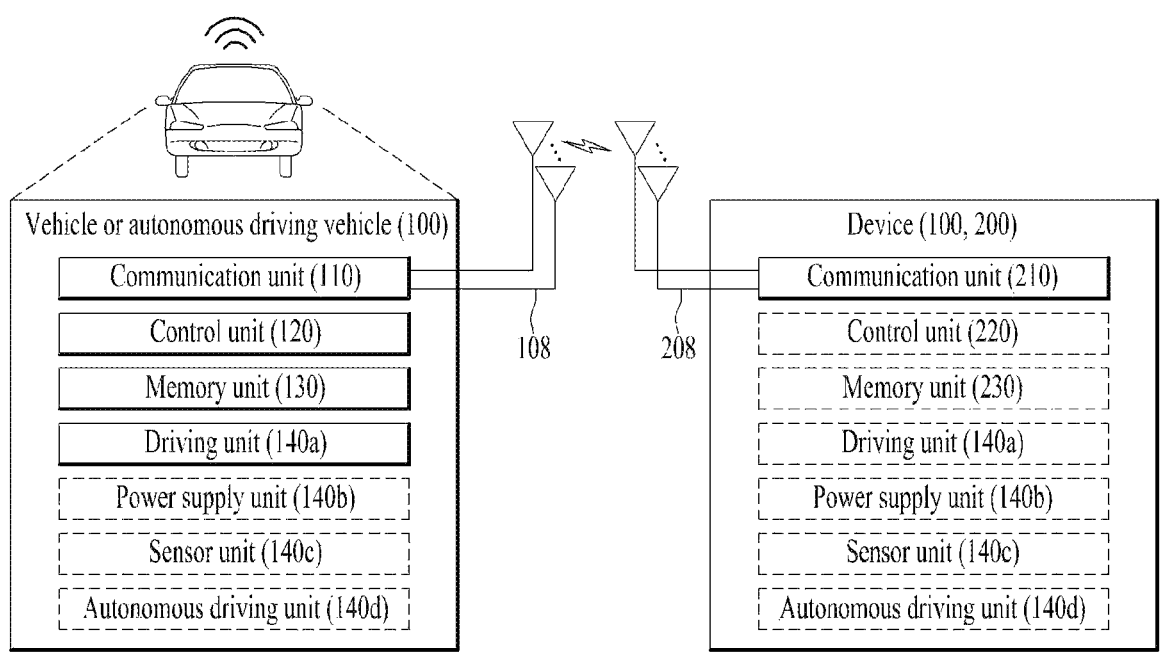
FIG. 15 illustrates a vehicle or an autonomous driving vehicle applied to the present invention.

Examples of Vehicles or Autonomous Vehicles to which the Present Invention is Applied FIG. 15 illustrates a vehicle or an autonomous driving vehicle applied to the present invention. The vehicle or autonomous driving vehicle may be implemented by a mobile robot, a car, a train, a manned/unmanned Aerial Vehicle (AV), a ship, etc.

Referring to FIG. 15, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 14, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the acquired data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present invention are combined in a predetermined form. Each component or feature should be considered optional unless explicitly stated otherwise. Each component or feature may be implemented in a form that is not combined with other components or features. In addition, it is also possible to constitute an embodiment of the present invention by combining some components and/or features. The order of operations described in the embodiments of the present invention may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present invention have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

What is claimed is:

1. A method performed by a first user equipment (UE), the method comprising:
   receiving a first signal including resource allocation information including information for allocating resources for a first carrier through a second carrier;
   receiving a second signal including at least one of a reference signal for a beam measurement or first data through the first carrier based on the resource allocation information; and
   transmitting a third signal including feedback information related to the second signal,
   wherein the first signal, the second signal and the third signal are signals for direct communication between UEs,
   wherein, based on data related to the first carrier not being generated, the third signal is transmitted through the second carrier based on the resource allocation information, and
   wherein, based on the data related to the first carrier being generated, the third signal is transmitted through the first carrier regardless of the resource allocation information.

2. The method of claim 1, wherein the feedback information comprises a beam measurement report measured using the reference signal for the beam measurement or Hybrid Automatic Repeat Request (HARQ) feedback on the first data.

3. The method of claim 2, wherein the beam measurement report comprises at least one of a measurement result for a RSRP (Reference Signal Received Power), a beam failure announcement, or a beam failure recovery request.

4. The method of claim 1, wherein the first carrier has a frequency band higher than the second carrier.

5. The method of claim 4, wherein the first carrier comprises a carrier in a mmWave frequency band.

6. A method performed by a second user equipment (UE), the method comprising:
   transmitting, to a first UE, a first signal including resource allocation information including information for allocating resources for a first carrier through a second carrier;
   transmitting, to the first UE, a second signal including at least one of a reference signal for a beam measurement or first data through the first carrier based on the resource allocation information; and
   receiving, from the first UE, a third signal including feedback information related to the second signal,
   wherein the first signal, the second signal and the third signal are signals for direct communication between UEs,
   wherein, based on data related to the first carrier not being generated by the first UE, the third signal is received through the second carrier based on the resource allocation information, and
   wherein, based on the data related to the first carrier being generated by the first UE, the third signal is received through the first carrier regardless of the resource allocation information.

7. A chipset comprising:
   at least one processor; and
   at least one memory operably connected to the at least one processor and enabling the at least one processor to perform an operation when executed, the operation comprising:
   receiving a first signal including resource allocation information including information for allocating resources for a first carrier through a second carrier;
   receiving a second signal including at least one of a reference signal for a beam measurement or first data through the first carrier based on the resource allocation information; and
   transmitting a third signal including feedback information related to the second signal,
   wherein the first signal, the second signal and the third signal are signals for direct communication between UEs,
   wherein, based on data related to the first carrier not being generated, the third signal is transmitted through the second carrier based on the resource allocation information, and
   wherein, based on the data related to the first carrier being generated, the third signal is transmitted through the first carrier regardless of the resource allocation information.

* * * * *